(12) United States Patent
Wang et al.

(10) Patent No.: US 10,853,344 B2
(45) Date of Patent: Dec. 1, 2020

(54) UNDERSTANDING TABLES FOR SEARCH

(71) Applicant: Microsoft Technology Licensing, LLC, Redmond, WA (US)

(72) Inventors: Zhongyuan Wang, Beijing (CN); Kanstantsyn Zoryn, Redmond, WA (US); Zhimin Chen, Redmond, WA (US); Kaushik Chakrabarti, Redmond, WA (US); James P. Finnigan, Redmond, WA (US); Vivek R. Narasayya, Redmond, WA (US); Surajit Chaudhuri, Redmond, WA (US); Kris Ganjam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 15/661,269

(22) Filed: Jul. 27, 2017

(65) Prior Publication Data

US 2017/0322964 A1     Nov. 9, 2017

Related U.S. Application Data

(63) Continuation of application No. 14/505,188, filed on Oct. 2, 2014, now Pat. No. 9,734,181.

(30) Foreign Application Priority Data

Jun. 30, 2014   (WO) ................ PCT/CN2014/081109

(51) Int. Cl.
*G06F 7/02*      (2006.01)
*G06F 16/00*     (2019.01)
(Continued)

(52) U.S. Cl.
CPC ........ *G06F 16/2282* (2019.01); *G06F 16/211* (2019.01); *G06F 16/221* (2019.01);
(Continued)

(58) Field of Classification Search
CPC ...... G06F 16/2282; G06F 16/21; G06F 16/22; G06F 16/211; G06F 16/221;
(Continued)

(56) References Cited

U.S. PATENT DOCUMENTS

| | | | |
|---|---|---|---|
| 7,054,871 B2 | 5/2006 | Hu et al. | |
| 9,116,940 B1 | 8/2015 | Gupta et al. | |

(Continued)

FOREIGN PATENT DOCUMENTS

| | | |
|---|---|---|
| CN | 101556606 A | 10/2009 |
| CN | 103198069 A | 7/2013 |

(Continued)

OTHER PUBLICATIONS

Wang, Jingjing et al, "Understanding Tables on the Web," Microsoft Research Asia, 2012 (Year: 2012).*

(Continued)

*Primary Examiner* — Bruce M Moser
(74) *Attorney, Agent, or Firm* — Ray Quinney & Nebeker, P.C.; Thomas M. Hardman; Timothy J. Churna

(57) ABSTRACT

The present invention extends to methods, systems, and computer program products for understanding tables for search. Aspects of the invention include identifying a subject tuple (e.g., a subject column) for a table, detecting a tuple header (e.g., a column header) using other tables, and detecting a tuple header (e.g., a column header) using a knowledge base. Implementations can be utilized in a structured data search system (SDSS) that indexes structured information, such as, tables in a relational database or html tables extracted from web pages. The SDSS allows users to (Continued)

search over the structured information (tables) using different mechanisms including keyword search and data finding data.

16 Claims, 9 Drawing Sheets

(51) Int. Cl.
| | |
|---|---|
| *G06F 16/22* | (2019.01) |
| *G06F 16/21* | (2019.01) |
| *G06F 16/28* | (2019.01) |
| *G06F 16/901* | (2019.01) |
| *G06F 16/955* | (2019.01) |
| *G06F 16/2455* | (2019.01) |
| *G06F 16/951* | (2019.01) |

(52) U.S. Cl.
CPC ........ *G06F 16/2455* (2019.01); *G06F 16/284* (2019.01); *G06F 16/901* (2019.01); *G06F 16/951* (2019.01); *G06F 16/955* (2019.01)

(58) Field of Classification Search
CPC .... G06F 16/951; G06F 16/901; G06F 16/955; G06F 16/2455; G06F 16/285
See application file for complete search history.

(56) References Cited

U.S. PATENT DOCUMENTS

| | | | |
|---|---|---|---|
| 2006/0002607 A1* | 1/2006 | Boncyk | G06F 16/7335 382/165 |
| 2006/0230016 A1 | 10/2006 | Cunningham et al. | |
| 2010/0114902 A1 | 5/2010 | Embley et al. | |
| 2010/0205521 A1 | 8/2010 | Folting | |
| 2011/0219008 A1* | 9/2011 | Been | G06F 16/00 707/742 |
| 2011/0270815 A1 | 11/2011 | Li | |
| 2012/0191702 A1 | 7/2012 | Musial et al. | |
| 2012/0197908 A1 | 8/2012 | Unno | |
| 2013/0138655 A1 | 5/2013 | Yan et al. | |
| 2013/0181715 A1 | 7/2013 | Biber | |
| 2013/0191715 A1 | 7/2013 | Raskovic et al. | |
| 2013/0290338 A1 | 10/2013 | Lee et al. | |
| 2014/0074819 A1 | 3/2014 | Idicula et al. | |
| 2014/0081934 A1* | 3/2014 | Mizell | G06F 16/2308 707/696 |
| 2016/0012052 A1* | 1/2016 | Zoryn | G06F 16/951 707/728 |
| 2017/0262529 A1* | 9/2017 | Chim | G09B 7/02 |

FOREIGN PATENT DOCUMENTS

| | | |
|---|---|---|
| CN | 103605641 A | 2/2014 |
| EP | 2728493 A1 | 5/2014 |
| JP | 2008282366 A | 11/2008 |
| RU | 2433472 C2 | 6/2011 |
| WO | 2013049084 A1 | 4/2013 |

OTHER PUBLICATIONS

Zhang, Meihui et al, "InfoGather+: Semantic Matching and Annotation of Numeric and Time-Varying Attributes in Web Tables," SIGMOD/13, Jun. 22-27, 2013 (Year: 2013).*
Venetis. Petros et al, "Recovering Semantics of Tables on the Web," Proceedings of the VLDB Endowment, vol. 4 No. 9, 2011 (Year: 2011).*
"First Office Action and Search Report Issued in Chinese Patent Application No. 201480047962.0", dated Aug. 20, 2018, 17 Pages.
"Office Action Issued in Japanese Patent Application No. 2016-575801", dated Jun. 29, 2018, 6 Pages.
"Search Report Issued in European Patent Application No. 14896741.7", dated Apr. 23, 2018, 11 Pages.
"Office Action and Search Report Issued in Russian Patent Application No. 2016152191", dated Apr. 20, 2018, 6 Pages.
Yakout, et al., "InfoGather: Entity Augmentation and Attribute Discovery by Holistic Matching with Web Tables", In Proceedings of the 2012 international conference on Management of Data, Jan. 2012, 12 Pages.
"Supplementary Search Report Issued in European Patent Application No. 14896741.7", dated Nov. 28, 2017, 13 Pages.
"Office Action Issued in Russian Patent Application No. 2016152191", dated Feb. 10, 2017, 2 Pages. (W/o English Translation).
Fan, et al., "A Hybrid Machine-Crowdsourcing System for Matching Web Tables", In Proceedings of 30th International Conference on Data Engineering, Mar. 31, 2014, pp. 976-987.
"Non-Final Office Action Issued in U.S. Appl. No. 14/505,188", dated Sep. 29, 2016, 11 Pages.
"Notice of Allowance Issued in U.S. Appl. No. 14/505,188", dated Apr. 12, 2017, 10 Pages.
"Web Data Commons—Web Tables", Retrieved from <<http://webdatacommons.org/webtables/>>, Retrieved on: Apr. 7, 2014, 4 Pages.
Cafarella, et al., "Data Integration for the Relational Web", In Proceedings of the VLDB Endowment, vol. 2, Issue 1, Aug. 24, 2009, 12 Pages.
Cafarella, "Uncovering the Relational Web", In Proceedings of the 11th International Workshop on Web and Databases, Jun. 13, 2008, 6 Pages.
Fang, et al., "Table Header Detection and Classification", In Proceedings of the 26th AAAI Conference on Artificial Intelligence, Jul. 22, 2012, 7 Pages.
Liu, Ying, "Tableseer: Automatic Table Extraction, Search, and Understanding", In Doctoral Dissertation in Information Sciences and Technology, Dec. 2009, 171 Pages.
"International Search Report & Written Opinion Issued in PCT Application No. PCT/CN2014/081109", dated Mar. 27, 2015, 13 Pages.
Pimplikar, et al., "Answering Table Queries on the Web using Column Keywords", In Proceedings of the VLDB Endowment, vol. 5, Issue 10, Aug. 27, 2012, 12 Pages.
Venetis, et al., "Table Search Using Recovered Semantics", In Proceedings of the VLDB Endowment, vol. 4, Issue 9, Sep. 13, 2010, 11 pages.
Wang, et al., "Understanding Tables on the Web", In Proceedings of the 31st International Conference on Conceptual Modeling, vol. 7535, Oct. 15, 2012, 14 Pages.
Bhagavatula, et al., "Methods for Exploring and Mining Tables on Wikipedia", In Proceedings of the ACM SIGKDD Workshop on Interactive Data Exploration and Analytics, Aug. 11, 2013, 9 Pages.
"Office Action Issued in European Patent Application No. 14896741.7", dated Sep. 18, 2019, 6 Pages.
"Office Action Issued in Brazil Patent Application No. BR112016027272-2", dated Apr. 1, 2020, 5 Pages.

* cited by examiner

Table 600

| IATA | ICAO | Airline | Call Sign | Country |
|---|---|---|---|---|
|  | EVY | 34 Squadron, Royal Australian Air Force |  | Australia |
|  | GNL | 135 Airways | GENERAL | United States |
| 1T | RNX | 1 Time Airline | NEXT TIME | South Africa |
|  | WYT | 2 Sqn No 1 Elementary Flying Training School |  | United Kingdom |
|  | TFU | 213 Flight Unit |  | Russia |
|  | CHD | 223 Flight Unit State Airline | CHKALOVSK-AVIA | Russia |

Column 601 — 602

*Fig. 6*

$$E = \{e_i, i \in 1, \ldots, M\} \quad 701$$

$$P(c_k|E) = \frac{P(E|c_k)P(c_k)}{P(E)} \propto P(c_k) \prod_{i=1}^{M} P(e_i|c_k), \quad 702$$

$$P(e_i|c_k) = \frac{P(e_i, c_k)}{P(c_k)} \quad 703$$

*Fig. 7*

| # | Name | Date of Birth | Height | Weight | Spike | Block |
|---|------|---------------|--------|--------|-------|-------|

Header 800

Fig. 8

$$P(a|c) = \frac{n(c,a)}{\sum_{a^* \in c} n(c,a^*)} \quad \text{— 901}$$

$$P(a|c) = \sum_{i \in c} P(a,i|c) = \sum_{i \in c} P(a|i,c)P(i|c) \quad \text{— 902}$$

$$P(a|i,c) = P(a|i) = \frac{n(i,a)}{\sum_{a^* \in c} n(i,a^*)} \quad \text{— 903}$$

$$P(i|c) = \frac{P(c|i)P(i)}{\sum_{i^* \in c} P(c|i^*)P(i^*)} \quad \text{— 904}$$

$$\hat{c} = \arg\max_{c} P(c|A) \quad \text{— 905}$$

$$P(c|A) = \frac{P(A|c)P(c)}{P(A)} \propto P(c) \prod_{a \in A} P(a|c) \quad \text{— 906}$$

Fig. 9

| Country name | County seat | Year founded | 2010 population | Percent of total | Area (sq. mi.) | % of total |
|---|---|---|---|---|---|---|
| Androscoggin | Auburn | 1854 | 107,702 | 8.11% | 497 | 1.44% |
| Aoostock | Houlton | 1839 | 71,870 | 5.41% | 6,829 | 19.76% |
| Cumberland | Portland | 1760 | 281,674 | 21.20% | 1,217 | 3.52% |
| Franklin | Farmington | 1838 | 30,768 | 2.32% | 1,744 | 5.05% |
| Hancock | Ellsworth | 1789 | 54,418 | 4.10% | 1,522 | 4.40% |
| Kennebec | Augusta | 1799 | 122,151 | 9.20% | 951 | 2.75% |
| Knox | Rockland | 1860 | 39,736 | 2.99% | 1,142 | 3.30% |

*Fig. 10*

UNDERSTANDING TABLES FOR SEARCH

CROSS-REFERENCE TO RELATED APPLICATIONS

This application is a continuation of and claims the benefit of and priority to U.S. patent application Ser. No. 14/505,188, entitled "UNDERSTANDING TABLES FOR SEARCH", filed Oct. 2, 2014 by Zhongyuan Wang et al., the entire contents of which are expressly incorporated by reference.

That application claims priority to PCT Application No. CN2014/081109, filed Jun. 30, 2014, and entitled "UNDERSTANDING TABLES FOR SEARCH"

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Search engines can be used on networks, including the Internet, to locate information of interest to a user. A search engine typically uses a crawler that continual crawls Web pages on a network, such as, the Internet, to index content. To find content, a user submits one or more search terms to the search engine. The search engine identifies pages deemed to contain content relevant to the one or more search terms. The search engine then returns links to the identified pages back to the user. The user can then select (e.g., "click") a link to view content of a corresponding page.

A structured data search system (SDSS) similarly crawls a network, such as the Internet, to index structured information. Structured information can include tables in a relational database or HTML tables extracted from Web pages. To find structured data, a user submits one or more search terms to the SDSS. The SDSS identifies structured data, such as, a table, deemed to contain content relevant to the one or more search terms. The search engine then returns the structured data back to the user. The user can then integrate the structured data into their applications.

To effectively index structured data, such as, a table, at least some understanding of the structured data is necessary. Some tables on a network can expressly define their subject column and column headers. An SDDS can index these types of tables relatively efficiently. Other tables on the network may not expressly define their subject column and/or column headers. An SDSS may be incapable of indexing these other types of tables.

Due to the diversity of content generation on the Internet, a substantial portion of tables on the Internet lack an expressly defined subject column and/or expressly defined column headers. Since an SDSS may be incapable of indexing tables lacking an expressly subject column and/or expressly defined column headers, it is highly unlikely of returning such tables in response to a user search. Thus, it may be very difficult for a user to find tables that lack an expressly subject column and/or that lack expressly defined column headers, even if the content of such tables would be useful.

BRIEF SUMMARY

The present invention extends to methods, systems, and computer program products for understanding tables for search. Aspects of the invention include identifying a subject tuple (e.g., a subject column) for a table, detecting a tuple header (e.g., a column header) using other tables, and detecting a tuple header (e.g., a column header) using a knowledge base.

In one aspect, a tuple (e.g., column) is selected from a table. The tuple is potentially a subject tuple (e.g., a subject column) of the table based on one or more selection considerations. The tuple includes a plurality of values. A co-occurrence for values in the tuple is determined by determining how often values in the tuple are included in subject tuples (e.g., subject columns) in a plurality of other tables. The determined co-occurrence indicates a likelihood of the tuple being a subject tuple. The tuple is classified as one of: a subject tuple of the table or a non-subject tuple of the table based on the determined co-occurrence.

In another aspect, a table includes a first one or more tuples and a second one or more tuples forming a table. The first one or more tuples are perpendicular to the second one or more tuples (e.g., columns and rows). A tuple (e.g., column) header is detected for the first one or more tuples (e.g., one or more columns).

A set of candidate tuple (e.g., column) names is constructed for the first one or more tuples. For each candidate tuple name in the set of candidate tuple names, a candidate tuple name frequency is calculated for the candidate tuple name. The candidate tuple name frequency is calculated by identifying one or more other tables, from among a set of other tables, that also contain the candidate tuple name as a candidate tuple name. A tuple, from among the second one or more tuples (e.g., one or more rows), is selected as a header tuple for the first one or more tuples based on the candidate tuple name frequencies for the candidate tuple names in the tuple.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings.

Understanding that these drawings depict only some implementations of the invention and are not therefore to be considered to be limiting of its scope, the invention will be described and explained with additional specificity and detail through the use of the accompanying drawings in which:

FIG. 6 illustrates an example table.

FIG. 7 illustrates various equations used to infer concepts from a set of instances.

FIG. 8 illustrates an example header row.

FIG. 9 illustrates various equations used to calculate typicality scores for extracted attributes.

FIG. 10 illustrates an example table.

DETAILED DESCRIPTION

Figure 1:
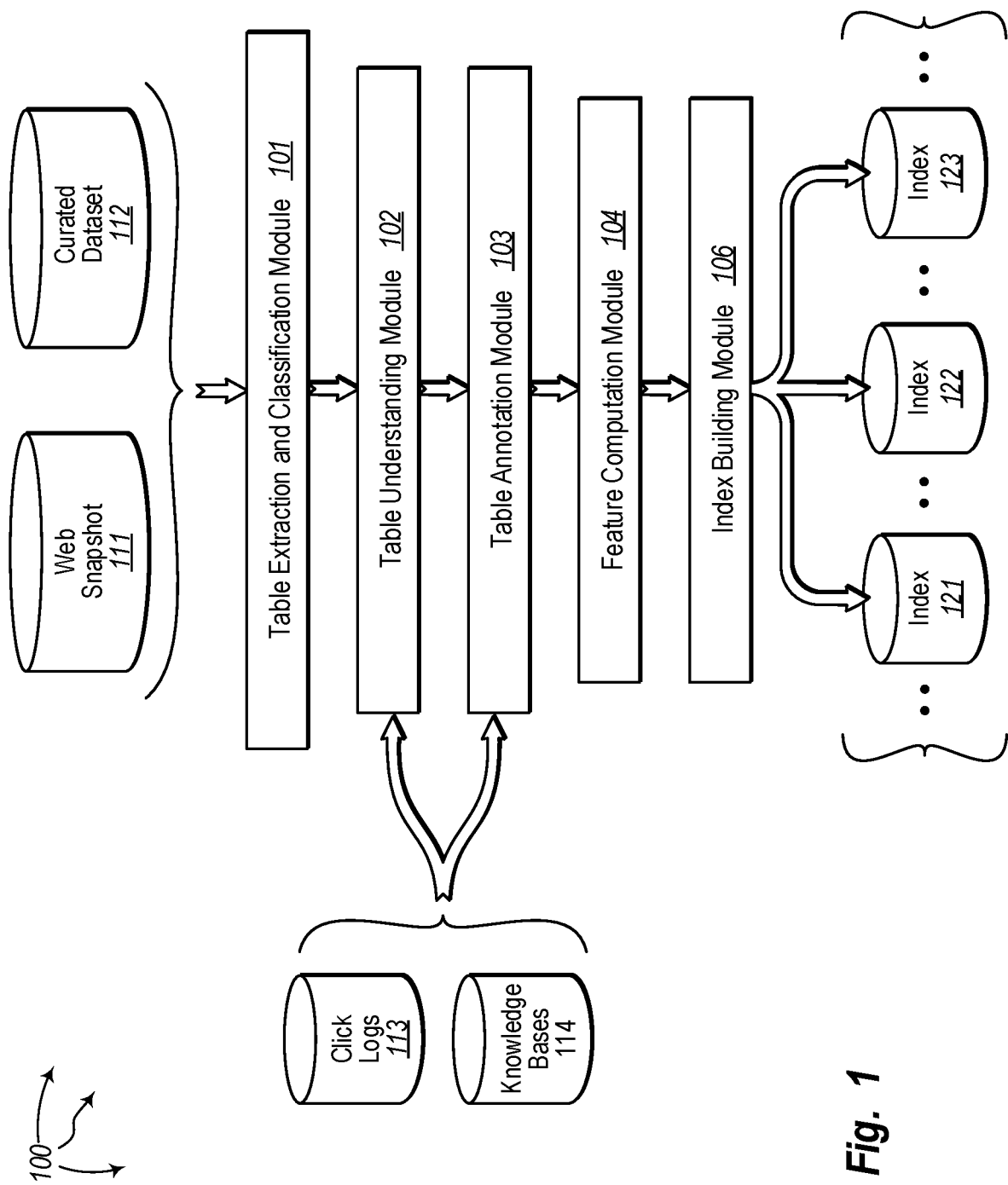
FIG. 1 illustrates an example computer architecture that facilitates building one or more indexes from one or more datasets of structured data.

The present invention extends to methods, systems, and computer program products for understanding tables for search. Aspects of the invention include identifying a subject column for a table, detecting a column header for a table using other tables, and detecting a column header for a table using a knowledge base.

Implementations of the present invention may comprise or utilize a special purpose or general-purpose computer including computer hardware, such as, for example, one or more processors and system memory, as discussed in greater detail below. Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In these description and the following claims, a "table" is defined as set of data elements (values) using a model of vertical columns and horizontal rows. Each intersection of a row and column represents a cell. Rows can be identified by the values appearing in a specified column subset, for example, identified as a key index. Tables can be found in databases, in web pages, in curated datasets, captured from images (e.g., whiteboards), found in other files (e.g., Portable Document Format ("PDF") files), or found in other sources, etc. Aspects of the invention can be used to understand tables from any of these sources.

One or more columns of a table can be subject columns. A subject column contains the names of entities the table is about. Other columns in a table represent relationships or attributes of entities in a subject column. A subject column can be viewed as an approximate key.

A row of a table can be a column header. A column header for a table contains names of the table's columns.

Referring briefly to FIG. 10, FIG. 10 depicts a table 1000. Table 1000 has subject column 1021 "County Name" and column header 1022.

Aspects of the invention include identifying a subject column for a table, detecting a column header for a table using other tables, and detecting a column header using a knowledge base.

Index Build Architecture

FIG. 1 illustrates an example computer architecture 100 that facilitates building one or more indexes from one or more datasets of structured data. Referring to FIG. 1, computer architecture 100 includes table extraction and classification module 101, table understanding module 102, table annotation module 103, feature computation module 104, index building module 106, web snapshot 111, curated dataset 112, click logs 113, knowledge bases 114, and indexes 121, 122, and 123. Each of table extraction and classification module 101, table understanding module 102, table annotation module 103, feature computation module 104, index building module 106, web snapshot 111, curated dataset 112, click logs 113, and knowledge bases 114, and indexes 121, 122, and 123 can be connected to one another over (or be part of) a network, such as, for example, a Local Area Network ("LAN"), a Wide Area Network ("WAN"), and even the Internet. Accordingly, each of table extraction and classification module 101, table understanding module 102, table annotation module 103, feature computation module 104, index building module 106, web snapshot 111, curated dataset 112, click logs 113, and knowledge bases 114, and indexes 121, 122, and 123, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

In general, computer architecture 100 can leverage web snapshot 111, and possibly also one or more curated datasets 112, to build one or more of indexes 121, 122, and 123. Computer architecture 100 can extract tables (e.g., web tables) from web snapshot 111 and/or one or more curated datasets 112, understand and annotate the extracted tables, and build one or more of indexes 121, 122, and 123 based on the understanding/annotation of the tables. Indexes 121, 122, and 123 can then be used by an index serve component to retrieve candidate results to user queries as well as rank candidate result tables based on relevance. Each of indexes 121, 122, and 123 can be a different type of index, such as, for example, a string mapping index that maps tokens to identifiers and contains inverse document frequencies of the tokens, a keyword (inverted) or feature index that can be used to retrieve top ranked tables for user queries, or a table content index that can be used to generate previews/snippets for retrieved tables as well as fetch complete tables when requested.

Within computer architecture 100, table extraction and classification module 101 can receive web snapshot 111 and/or curated data set 112 as input. Web snapshot 111 can include tables (e.g., web tables) in HyperText Markup Language (HTML) format. Curated dataset 112 can include tables in a site specific format, such as, for example, data from data.gov or the World Bank. Web snapshot 111 and curated dataset 112 can be created using wrappers and/or crawlers that scrape sites, understand the format of those sites, and extract tables. For example, Web snapshot 111 can be created from scraping the Internet. Thus, Web snapshot 111 can include web tables. The web tables can be relational or non-relational. Some tables may expressly define a subject column and column headers. Other tables may lack an express definition of a subject column and/or column headers.

Table extraction and classification module 101 can extract tables from web snapshot 111 and/or curated data set 112. Table extraction and classification module 101 can filter out tables of no value, such as, for example, tables used for navigational/layout purposes. From any remaining tables, table extraction and classification module 101 can classify tables as relational and/or non-relational tables. In one aspect, table extraction and classification module 101 also filters out non-relational tables. Table extraction and classification module 101 can output tables (e.g., relational tables) for use by other modules in computer architecture 100.

Click logs 113 can include link selection information ("clicks") logged for a plurality of network users. For the Internet, click logs 113 can include link selection information for a larger plurality of users. Knowledgebases 114 can include different classes of knowledgebase. One class of knowledgebase can contain structured information about entities and/or relationships between entities, such as, for example, web tables in web snapshot 111 and/or curated dataset 112. For example, a knowledge base can include information about table entities, including: entity names, entity types, entity attributes, and values for entity attributes. Another class of knowledgebase are those extracted from Web documents (e.g., using text patterns).

Table understanding module 102 can receive tables (e.g., web tables, relational tables, etc.) extracted by table extraction and classification module 101 as input. Table understanding module 102 can use various different table understanding algorithms to understand tables. Some tables may lack expressly defined subject columns and/or expressly defined column headers. As such, table understanding algorithms can be configured to identify subject columns for tables and/or detect column headers for tables when tables do not expressly define such information. Table understanding module 102 can utilize click logs 113 and knowledgebases 114 to assist with understanding tables. Table understanding module 102 can output identified subject columns and detected column headers for tables.

Table annotation module 103 can receive tables (e.g., web tables, relational tables, etc.) extracted by table extraction and classification module 101. Table annotation module 103 can also receive identified subject columns and detected column headers for tables (e.g., from table understanding module 102). Table annotation module 103 can use various different table annotation algorithms to annotate tables with relevant content that is not expressly defined as being associated with tables. For example, on a web page containing a table, content within <table> and </table> tags (e.g., cell values and column names) can be useful in supporting keyword and data finding searches.

However, there can also be additional content useful in supporting keyword and data finding searches that is not within <table> and </table> tags. For example, additional content can be on a web page outside <table> and </table> tags, additional content can be in other web pages containing links to the web page, additional content can be in click log data, etc. As such, table annotation algorithms can be configured to identify this additional content and annotate corresponding tables with the additional content. Subsequently, index building module 106 can generate inverted index over this additional content as well as content within <table> and </table> tags.

Table annotation module 103 can utilize click logs 113 and knowledge bases 114 to assist with identifying additional content and annotating corresponding tables with the additional content. Table annotation module 103 can output tables annotated with corresponding additional content.

Feature computation module 104 can receive tables (e.g., web tables, relational tables, etc.). Feature computation module 104 can use various feature computation algorithms to compute (static) features of tables. The computed (static) features can be used for ranking. For example, feature computation module 104 can compute static (i.e., query independent) features of web tables for use in relevant ranking. Rankings can be used to help surface better (e.g., more reputed, more popular, or more relevant) web tables when many web tables satisfy a search query. Feature computation module 104 can output computed (static) features for tables.

Feature computation module 104 can be used with annotated or unannotated tables. When feature computation module 104 receives annotated tables, the various feature computation algorithms can use additional content contained in annotations to compute (static) features.

Index building module 106 can receive tables (e.g., web tables, relational tables, etc.). Index building module 106 can use various index building algorithms to build one or more of indexes 121, 122, and 123 from received tables. Index building module 106 can receive annotated or unannotated tables. When index building module 106 receives annotated tables, the various index building algorithms can use additional content contained in annotations when building indexes. Index building module 106 can also access computed (static) features for tables. When index building module 106 accesses computed (static) features for tables, the various index building algorithms can use the computed (static) features when building indexes.

Indexes can then be used to facilitate searches, including key word searches and data finding data searches. Keyword searches include a user entering a keyword query, such as, 'african countries gdp' into a search engine (or other similar system or module). The search engine (or other similar system or module) returns a list of ranked tables which appropriately satisfy the information need of the user. Data finding data searches include a user specifying a set of entities (e.g., from a spreadsheet) and optionally additional key words to a search engine (or other similar system or module). The search engine (or other similar system or module) returns tables containing requested information for the specified set of entities.

Subject Column Identification

Figure 2:
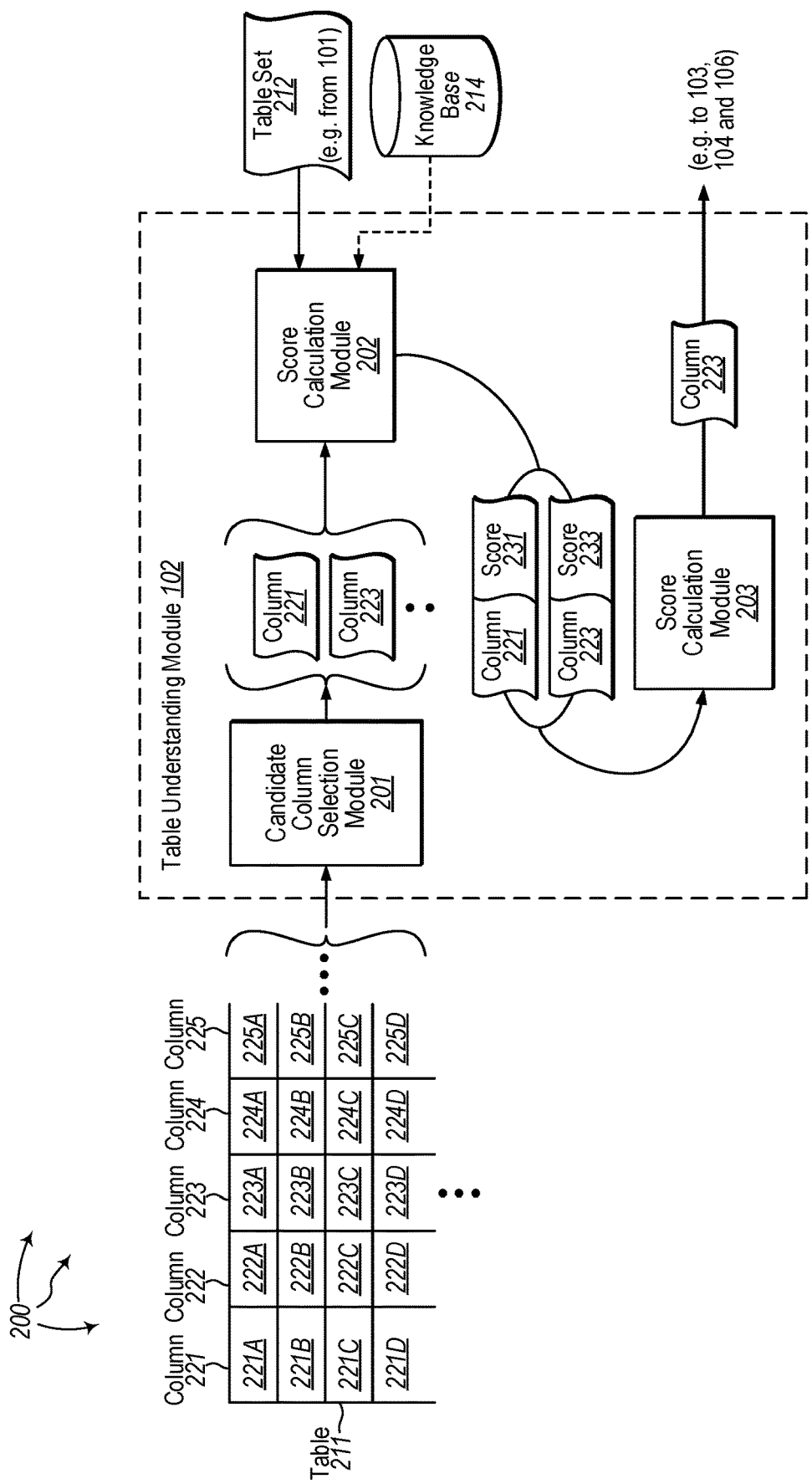
FIG. 2 illustrates an example computer architecture that facilitates identifying a subject column of a table.

FIG. 2 illustrates an example computer architecture 200 that facilitates identifying the subject column of a table. Referring to FIG. 2, computer architecture 200 includes candidate column selection module 201, score calculation module 202, and subject column selection module 203. Each of candidate column selection module 201, score calculation module 202, and subject column selection module 203 can be connected to one another over (or be part of) a network, such as, for example, a Local Area Network ("LAN"), a Wide Area Network ("WAN"), and even the Internet. Accordingly, each of candidate column selection module 201, score calculation module 202, and subject column selection module 203 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Candidate column selection module 201, score calculation module 202, and subject column selection module 203 can be included in table understanding module 102. Alternatively, candidate column selection module 201, score calculation module 202, and subject column selection module 203 can operate outside of table understanding module 102.

Candidate column selection module 201 is configured to receive a table (e.g., a web table) and select one or more columns of the table as candidate subject columns. Candidate selection module 201 can select a column as a candidate subject column based on one or more selection considerations. Candidate column selection module 201 can consider how other many columns separate a column from the left of a table. For at least some tables, the leftmost column is often the subject column.

Candidate column selection module 201 can consider if a column is a numeric or non-numeric column. For at least some tables, the subject column is often non-numeric. As such, candidate column selection module can consider if a column is numeric or nonnumeric. Candidate column selection module 201 can compute a score of whether a column is numeric or not. Preceding and trailing tokens can be removed from values for the column. For example, a column with revenue or price information may contain $ or mil as preceding/trailing tokens. These tokens can be removed to expose representative data. For a column, a fraction of the number of cells that are numeric can be calculated. For example, if a column has 100 cells and 80 cells have values that are numeric, then 80% of the cells are numeric. Columns determined to have more than a specified threshold of numeric cells can be excluded from further consideration as a subject column.

Thus, for non-numeric column's, candidate column selection module 201 can consider how other many columns separate a column from the left of a table.

Candidate column selection module 201 can consider the distinctness of cell values in a column. For at least some tables, subject columns are approximate keys (i.e., subject columns contain mostly distinct values but may contain some duplicates). Several different measures of distinctness can be considered for a column, including ratio of number of distinct cell values to total number of cells, number of occurrences of the most repeated value, etc.

Score calculation module 202 is configured to determine how frequently values in a candidate column co-occur in subject columns in other tables. For at least some tables, columns of the tables are properties/relationships of entities in the subject column. For example, a column for capital city can be a property/relationship of a state in corresponding subject column. As such, values in a true subject column can co-occur with column names more frequently compared to values in non-subject columns.

Score calculation module 202 can calculate a column score for each candidate column. In one aspect, score calculation module 202 selects the N (e.g., the three) leftmost non-numeric columns that exceed a specified distinctness threshold (e.g., 7) as candidate subject columns. For each candidate subject column, score calculation module 202 computes how many times each value in the candidate subject column occurs with each column name across a set (plurality) of other tables. For each value/column name, the number of co-occurrences is divided by the number of occurrences of the value across the set (plurality) of other tables to obtain a co-occurrence fraction. For example, if a value occurs in a subject column in 50 tables and occurs in 500 tables in total, the co-occurrence fraction is 50/500=0.1 (or 10%).

Score calculation module 202 can use the co-occurrence fraction for each value in a column to compute a column score for the column. For example, $V_1, V_2, \ldots, V_n$ can represent the set of values in a column. $C_1, C_2, \ldots, C_m$ can be column names. Thus, $f(V_i, C_j)$ represents the co-occurrence fraction of tables likely containing $V_i$ in a subject column where $C_j$ is a name of the column. One or more aggregate functions can be used to calculate an column score for a column from all of $f(V_i, C_j)$ for the column. Some values and column names can be tail values/column names, so even a few value/column names with a higher $f(V_i, C_j)$ can contribute to a higher overall score. One aggregate function calculates a column score for a column by taking the average of a specified top number of co-occurrence fractions for the column.

Alternately and/or in combination, score calculation module 202 can also consider co-occurrence of entities in a table (e.g., a web table) and column names in a knowledgebase. Columns of a table (e.g., a web table) are properties/relationships of entities in a subject column. As such, column names can occur within the same concept/type in a knowledge base. Score calculation module 202 can calculate a concept score for any potential concept (i.e., one that overlaps with the entities) that captures an overlap with entities and column names. A column with the most appropriate (e.g., highest) concept score can be selected.

Score calculation module 202 can also use a knowledgebase to determine whether candidate subject column name values have attributes in the knowledge base which match a table. Knowledgebase attributes matching a table can be used to identify multiple subject columns in a table. For example, score calculation module 202 can learn entity-attribute relationships within a table. That is, a table may be about States, yet may have a column Capitol and next to the Capitol column may have a population column which is the capital population (there could be a different column for state population).

Subject column selection module 203 is configured to receive column and/or concept scores for columns. From received scores, subject column selection module 203 can select one or more columns as subject columns. For example, based on a column score and/or a concept score, subject column selection module 203 can classify a column as a subject column or as a non-subject column.

Figure 3:
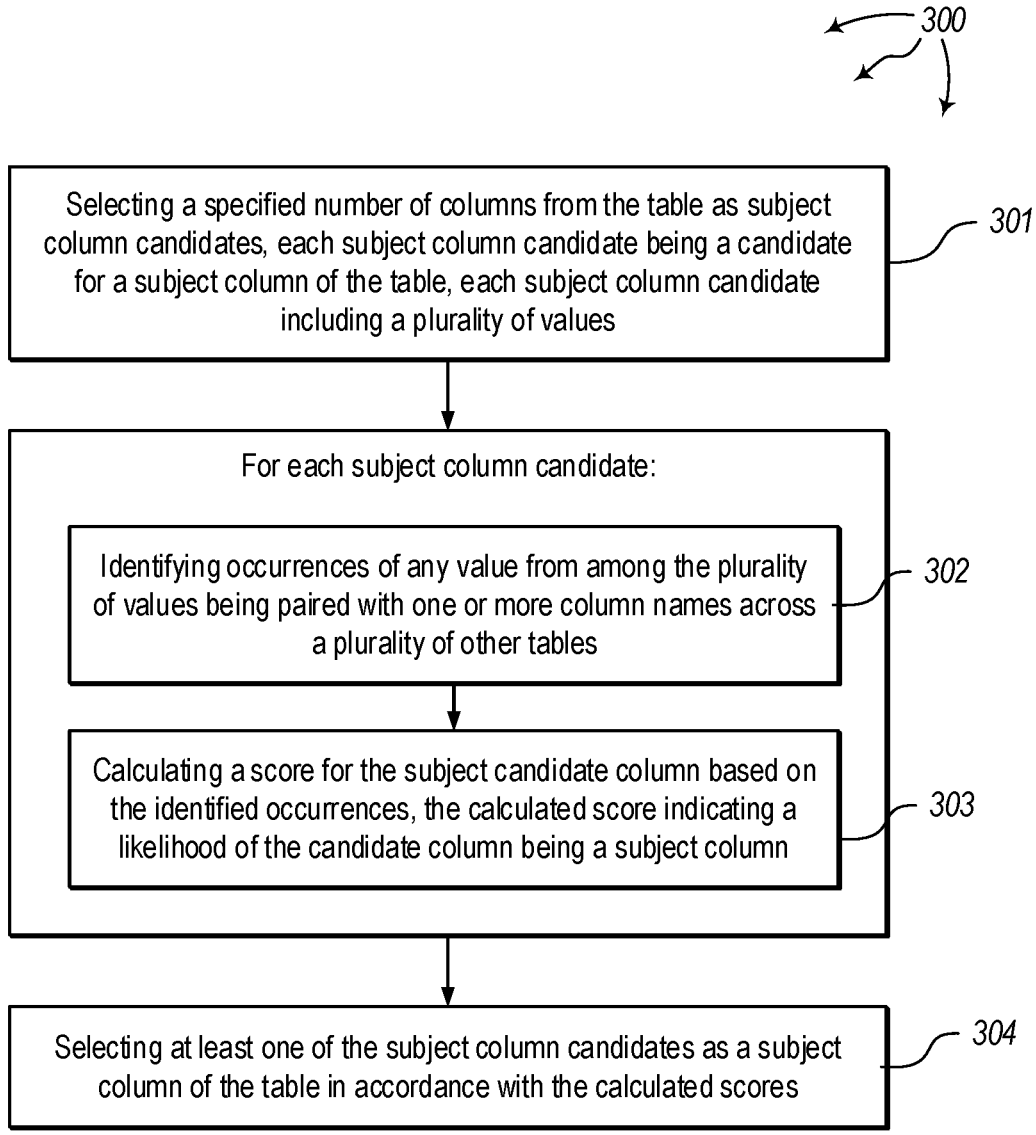
FIG. 3 illustrates a flow chart of an example method for identifying a subject column of a table.

FIG. 3 illustrates a flow chart of an example method 300 for identifying a table subject column. Method 300 will be described with respect to the components and data of computer architecture 200.

Method 300 includes selecting a specified number of columns from the table as subject column candidates, each subject column candidate being a candidate for a subject column of the table, each subject column candidate including a plurality of values (301). For example, candidate column selection module 201 can access table 211 (e.g., a web table). As depicted, table 211 includes columns 221, 222, 223, 224, 225, etc. Each column includes a plurality of values. Column 221 includes values 221A, 221B, 221C, 221D, etc. Column 222 includes values 222A, 222B, 222C, 222D, etc. Column 223 includes values 223A, 223B, 223C, 223D, etc. Column 224 includes values 224A, 224B, 224C, 224D, etc. Column 225 includes values 225A, 225B, 225C, 225D, etc.

Candidate column selection module 201 can select columns 221 and 223 as candidate subject columns. For example, columns 221 and 223 can be within the leftmost N non-numeric columns of table 211 and the values in columns 221 and 223 can also satisfy a distinctiveness threshold. Candidate column selection module 201 can send columns 221 and 223 to score calculation module 202. On the other hand, column 222 may be a numeric column and/or values in column 222 may not be sufficiently distinct. As such, column 222 is not considered a candidate subject column.

Score calculation module 202 can receive columns 221 and 223 from candidate column selection module 201.

Method 300 includes, for each subject column candidate, identifying occurrences of any value from among the plurality of values being paired with one or more column names across a plurality of other tables (302). For example, for column 221, score calculation module 202 can identify any occurrences of values 221A, 221B, 221C, 221D, etc. being paired with column names in an any of the tables in table set 212. Similarly, for column 223, score calculation module 202 can identify any occurrences of values 223A, 223B, 223C, 223D, etc. being paired with column names in an any of the tables in table set 212. In one aspect, table set 212 contains a plurality of relational web tables.

Method 300 includes, for each subject column candidate, calculating a score for the subject candidate column based on the identified occurrences, the calculated score indicating a likelihood of the candidate column being a subject column (303). For example, score calculation module 202 can calculate score 231 for column 221 and can calculate score 233 for column 223.

In some aspects, either alternately and/or in combination, score calculation module 202 considers the occurrence of values in columns 221 and 223 with the entities within the same concept/type in knowledge base 214 when calculating scores 231 and 233 respectively.

Score calculation module 202 can send column 221/score 231 and column 223/score 233 to subject column selection module 203. Subject column selection module 203 can receive column 221/score 231 and column 223/score 233 from score calculation module 202.

Method 300 includes selecting at least one of the subject column candidates as a subject column of the table in accordance with the calculated scores (304). For example, subject column selection module 203 can classify column 223 as a subject column in accordance with scores 231 and 233. Selection of column 223 as a subject column can be sent to one or more of table annotation module 103, feature computation module 104, and index building module 106.

In some implementations, a plurality of subject columns is identified. For example, a table may include multiple ways of referring to the subject of the table, such as, for example, in different languages, using abbreviations, etc. It may also be that a subject column is split between multiple columns, such as, for example, first name and last name).

For subject column detection, co-occurrence of column name pairs in a corpus of web tables can also be leveraged. If column name pairs for a candidate subject column occur with some regularity, there is increased likelihood that this is a subject column and an attribute that belongs to that subject. Actual cell values can also be similarly considered.

As such, identifying a subject column is useful because it can then be determined that other columns are attributes for the subject column. A user can search for a specific attributes. When a user has their own table, subject column detection can be performed for data finding data searches. For example, a user may be working on a spread sheet related to a particular subject. The user can enter "add population" to search for tables that cover the particular subject and have population.

Column Header Detection Using Tables

Figure 4:
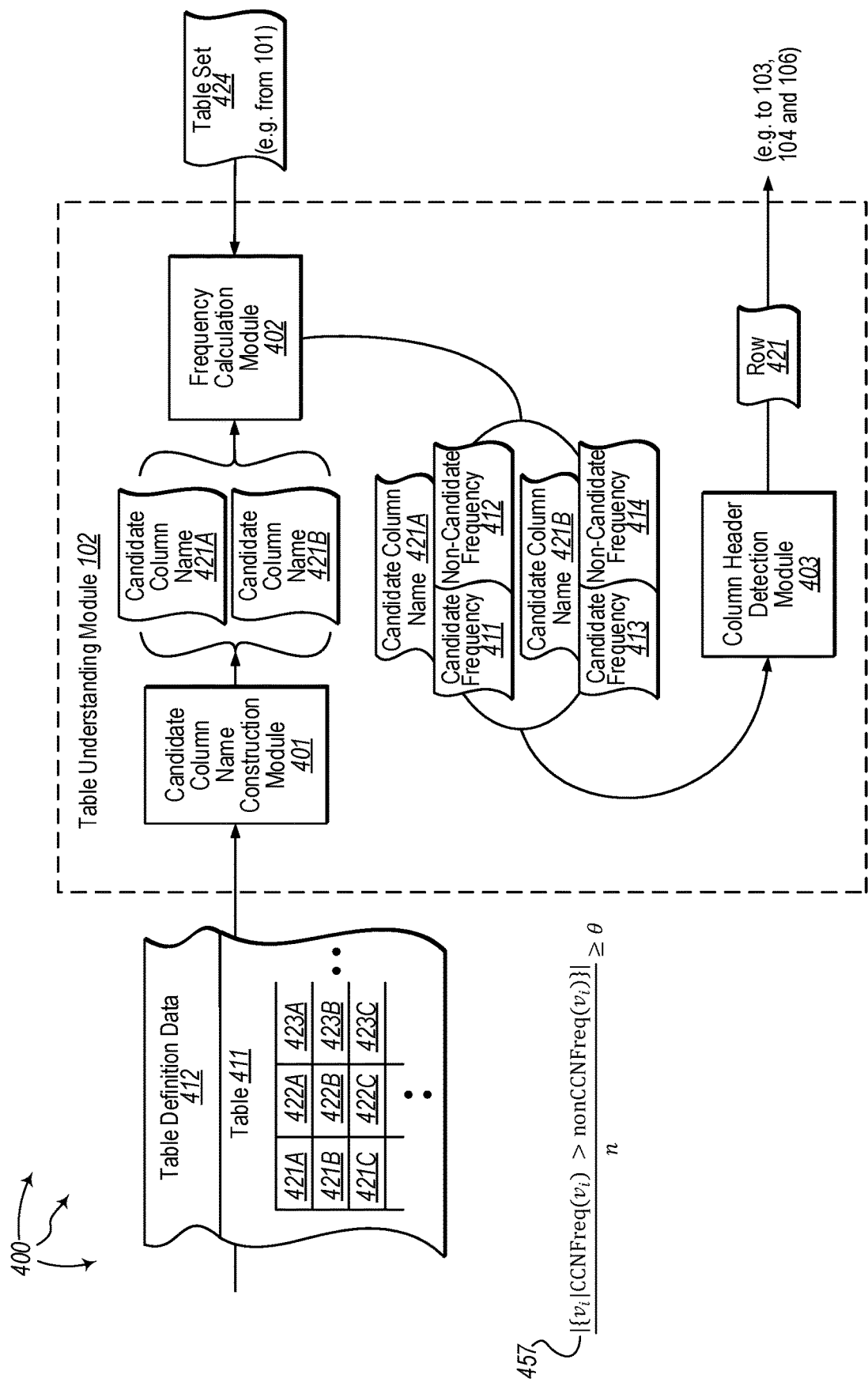
FIG. 4 illustrates example computer architecture that facilitates detecting a column header for a table.

FIG. 4 illustrates example computer architecture 400 that facilitates detecting a column header for a table. Referring to FIG. 4, computer architecture 400 includes candidate column name construction module 401, frequency calculation module 402, and column header detection module 403. Each of candidate column name construction module 401, frequency calculation module 402, and column header detection module 403 can be connected to one another over (or be part of) a network, such as, for example, a Local Area Network ("LAN"), a Wide Area Network ("WAN"), and even the Internet. Accordingly, each of candidate column name construction module 401, frequency calculation module 402, and column header detection module 403 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Candidate column name construction module 401, frequency calculation module 402, and column header detection module 403 can be included in table understanding module 102. Alternatively, candidate column name construction module 401, frequency calculation module 402, and column header detection module 403 can operate outside of table understanding module 102.

Candidate column name construction module 401 is configured to construct candidate column names from table definition data. Table definition date can include data defining a table as well as data derived from a table. Candidate column name construction module 401 can create a set of candidate column names including column names that occur in an express column header (e.g., within <th> or <thead> HyperText markup language (HTML) tags) and/or column names that occur in a first row of data in a table.

Frequency calculation module 402 can be configured to calculate frequencies of occurrence for each string that occur either as a column name or a cell value in any table (e.g., in table set 424). Frequency calculation module 402 can calculate the number of tables that contain a string as a candidate column name (CCNFreq) and the number of tables that otherwise contain the string (i.e., not as a candidate column name) (Non-CCNFreq).

Column header detection module 403 can be configured to detect a row of a table as a column header based on CCNFreqs and Non-CCNFreqs for strings in a table. For example, when strings (values) in the first row of data have higher CCNFreqs than Non-CCNFreqs, the first row is more likely to be a column header.

More specifically, for example, $V_1, V_2, \ldots, V_n$ can represent values in the first data row of a table. $CCNFreq(V_i)$ indicates the number of tables in which $V_i$ occurs, either as an express column header (e.g., within <th> or <thead>) or as a first row of data (e.g., when a column header is not expressly defined). $Non\text{-}CCNFreq(V_i)$ indicates the number of tables in which $V_i$ occurs other than in an express header or as a first row of data. A row can be selected as a column header when a fraction of values $V_i$ for which $CCNFreq(V_i)>Non\text{-}CCNFreq(V_i)$ exceeds a specified threshold (e.g., 0.5). In some aspects, column header detection module 403 selects a column header in accordance with equation 457. In equation 457, $\theta$ can vary depending on the strictness associated with detecting a column header.

Column header detection module 403 can also consider if a table has expressly defined column names and/or any of the values $V_1, V_2, \ldots, V_n$ are numeric. If a table has expressly defined column names, rows containing names other than the expressly defined column names are less likely to be a column header. Similarly, if a row contains numeric values, the row is less likely to be a column header.

Frequencies of individual tokens in a candidate cell can also be considered. In one aspect, frequency calculation module 402 can be configured to calculate frequencies of occurrence for each token in strings (e.g., candidate column names) that occur either as a column name or a cell value in any table (e.g., in table set 424). For example, tokens "Avg." and "Rainfall" can be identified from the string "Avg. Rainfall". Frequencies for "Avg." and "Rainfall" can be calculated separately, since these tokens can appear in other locations. For example, "Rainfall" could appear alone as a column name. "Avg." could appear in a column name "Avg. Temperature".

Frequency calculation module 402 can also implement appropriate aggregation functions on token level frequencies.

Column header detection module 403 can be configured to detect a row of a table as a column header based on CCNFreqs and Non-CCNFreqs for tokens in a table.

Figure 5:
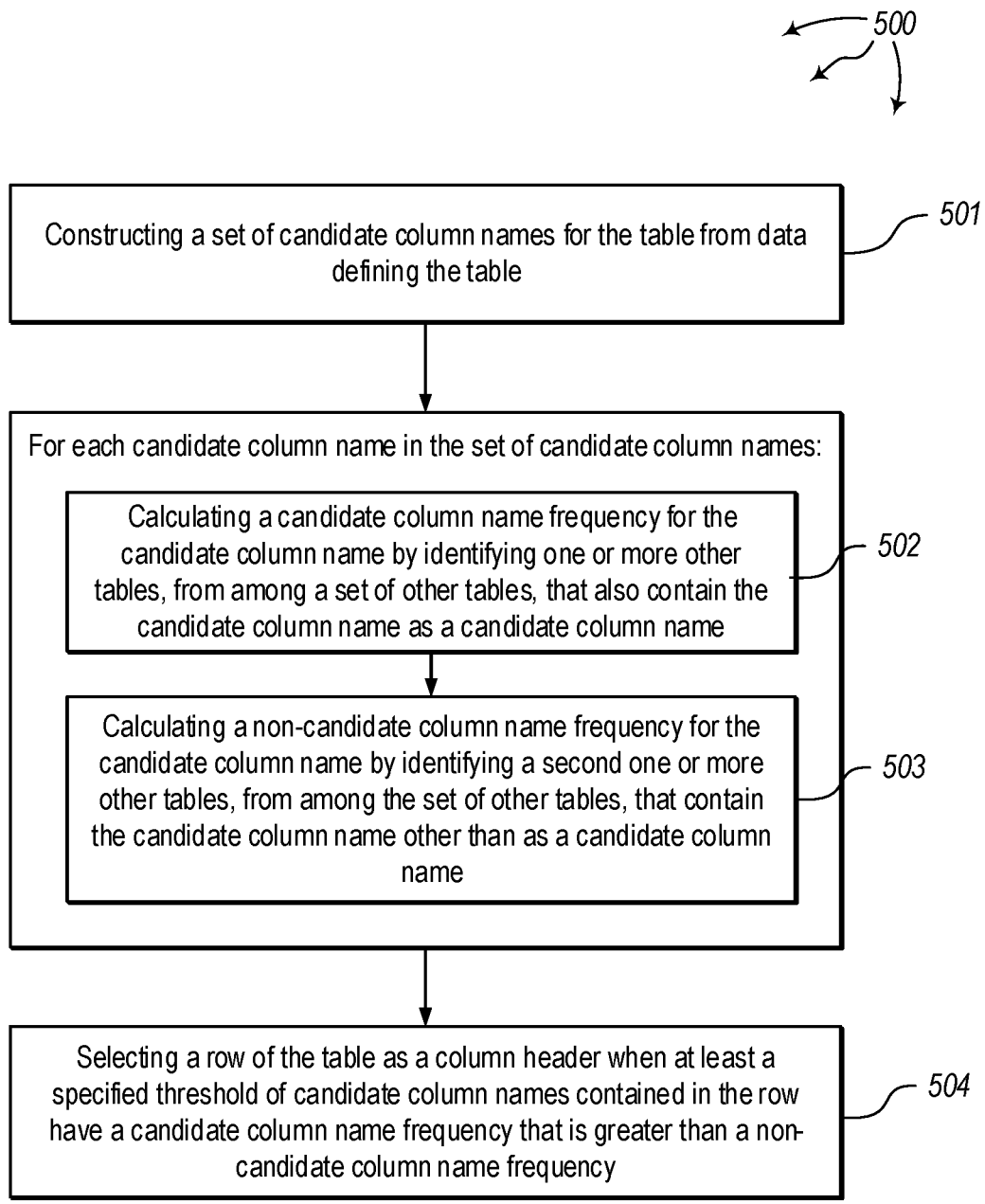
FIG. 5 illustrates a flow chart of an example method for detecting column header for a table.

FIG. 5 illustrates a flow chart of an example method 500 for detecting a column header for a table. Method 500 will be described with respect to the components and data of computer architecture 400.

Method 500 includes constructing a set of candidate column names for the table from data defining the table (501). For example, candidate column name construction module 401 can receive table 411 and table definition 412. Table definition 412 can define some properties of table 411. As depicted, table 411 includes rows 421 (a first row), 422, 423, etc. Each row contains values that are potentially column names. Row 421 includes values 421A, 421B, 421C, etc. Row 422 includes values 422A, 422B, 422C, etc. Row 423 includes values 423A, 423B, 423C, etc.

From table definition 412, candidate column name construction module 401 can determine that column names are not expressly defined for table 411. As such, candidate column name construction module 401 can construct a set of candidate column names from values of row 421 (the first row). For example, candidate column name construction module 401 can construct candidate column name 421A, candidate column name 421B, etc.

Candidate column name construction module 401 can send candidate column name 421A, candidate column name 421B, etc. to frequency calculation module 402. Frequency calculation module 402 can receive candidate column name 421A, candidate column name 421B, etc. from candidate column name construction module 401.

Method 500 includes for each candidate column name in the set of candidate column names, calculating a candidate column name frequency for the candidate column name by identifying a one or more other tables, from among a set of other tables, that also contain the candidate column name as a candidate column name (502). For example, frequency module 402 can calculate candidate frequency 411 for candidate column name 421A, can calculate candidate frequency 413 for candidate column name 421B, etc. To calculate candidate frequency 411, frequency module 402 can identify one or more tables from among table set 424 (e.g., a set of web tables) that also contain candidate column name 421A as a candidate column. Similarly, to calculate candidate frequency 413, frequency module 402 can identify one or more tables from among table set 424 that also contain candidate column name 421B as a candidate column. Similar calculations can be made to calculate candidate frequencies for other candidate column names (i.e., other values in row 421).

Method 500 includes for each candidate column name in the set of candidate column names, calculating a non-candidate column name frequency for the candidate column name by identifying a second one or more other tables, from among the set of other tables, that contain the candidate column name other than as a candidate column name (503). For example, frequency module 402 can calculate non-candidate frequency 412 for candidate column name 421A, can calculate non-candidate frequency 414 for candidate column name 421B, etc. To calculate non-candidate frequency 412, frequency module 402 can identify one or more tables from among table set 424 that contain candidate column name 421A but not as a candidate column name. Similarly, to calculate non-candidate frequency 413, frequency module 402 can identify one or more tables from among table set 424 that also contain candidate column name 421B but not as a candidate column name. Similar calculations can be made to calculate non-candidate frequencies for other candidate column names (i.e., other values in row 421).

Frequency calculation module 402 can send candidate column name 421A along with candidate frequency 411 and non-candidate frequency 412 to column header detection module 403. Similarly, frequency calculation module 402 can send candidate column name 421B along with candidate frequency 413 and non-candidate frequency 414 to column header selection module 403. Column header detection module 403 can receive candidate column name 421A along with candidate frequency 411 and non-candidate frequency 412 from frequency calculation module 402. Similarly, column header detection module 403 can receive candidate column name 421B along with candidate frequency 413 and non-candidate frequency 414 from frequency calculation module 402. Column header detection module 403 can also access table definition data 412 and table 411.

Method 500 includes selecting a row of the table as a column header when at least a specified threshold of candidate column names contained in the row have a candidate column name frequency that is greater than a non-candidate column name frequency (504). For example, column header detection module 403 can detect row 421 as a column header or table 411. Column header detection module 403 can determine that a specified threshold of candidate column names (e.g., 0.5) in row 421 have a candidate frequency that is greater than a non-candidate frequency. For example, for candidate column name 421A, column header detection module 403 can determine that candidate frequency 411 is greater than non-candidate frequency 412. Similarly, for candidate column name 421B, column header detection module 403 can determine that candidate frequency 413 is greater than non-candidate frequency 414.

Column Header Detection Using Knowledgebase

A. Using Conceptualization to Detect Whether a Header is Correct

Column headers can be detected and/or column header detection improved (e.g., confidence in selecting a row as a column header increased) using a knowledgebase. In general, concepts can be inferred from sets of instances and can be referred to as "conceptualization". Conceptualization can be based on a knowledge base. In some aspects, conceptualization is used to determine whether a header is correct. Turning to FIG. 6, FIG. 6 illustrates an example table 600 (e.g., a web table). Within table 600, the column header 602 "country" can be inferred from values Australia, Unites States, South Africa, etc. As such, column header 602 is a hypernym or concept of the values in column 601. Thus, column header 602 "country" is likely a correct column header.

Turning to FIG. 7, FIG. 7 illustrates various equations used to infer concepts from a set of instances. A knowledge base (e.g., among knowledge bases 114) can include tens of millions of concept-instance pair. Equation 701 represents a set of observed instances. For the observed instances, a set of more representative concepts describing the instances can be abstracted. The probability of concepts can be estimated using a naïve Bayes model depicted in equation 702. In equation 702, $c_k$ is a concept and, as depicted in equation 703, where $P(e_i, c_k)$ is proportional to the co-occurrence of instances and concepts, and $P(c_k)$ is approximately proportional to the observed frequency of $c_k$. In equation 702 Laplace smoothing is used to filter out noise and introduce concept diversities.

Based on the equations 701, 702, and 703, a concept with a larger posterior probability is ranked as the more likely concept to describe the observed instances. For example, given instances "China," "Russia," "India," and "USA," country can be suggested as a concept. However, given "China," "Indian," and "Russia," emerging market can be suggested as a concept.

B. Using Attribute Data and Attribute Conceptualization Techniques

A header row containing names can contain more obvious column names that can belong to the same concept. Turning to FIG. 8, FIG. 8 illustrates an example column header 800. The column names of column header 800 can belong to the same concept.

In general column names can be extracted from a column header to generate a column name list. It can then be determined if column names in the column name list can be conceptualized to the same hypernym. Syntactic patterns for concept-based and instance-based attributed extraction can be used on a web corpus to process documents and extract attributes. A syntactic pattern for concept-based extraction can be represented as: the ⟨a⟩ of (the/a/an) ⟨c⟩ [is]. A syntactic pattern for instance-based extraction can be represented as: the ⟨a⟩ of (the/a/an) ⟨i⟩ [is].

Within the syntactic patterns, ⟨a⟩ is a target attribute that is to be obtained from texts that match the syntactic patterns, ⟨c⟩ is a concept for which attributes are to be obtained, and ⟨i⟩ is an instance (sub-concept or entity) in concept ⟨c⟩. Both ⟨c⟩ and ⟨i⟩ can be form a knowledgebase semantic network. For example, to find attributes for the concept ⟨c⟩=wine. From the sentence, " . . . the acidity of a wine is an essential component of the wine . . . ", ⟨a⟩=acidity is a candidate attribute of wine. Furthermore, from the sentence "the taste of Bordeaux is . . . " ⟨a⟩=taste is an attribute of 'Bordeaux'. From the knowledgebase, it can be determined that 'Bordeaux' is an instance in the wine concept. Thus, ⟨a⟩=taste is also a candidate attribute of wine.

With a list of attributes, it can be determined how important and/or how typical each attribute is for the concept. As such, typicality scores can be calculated for attributes. More specifically:

P(c|a) denotes how typical concept c is, given attribute a.
P(a|c) denotes how typical attribute a is, given concept c.

To calculate typicality scores, two cases can be considered: attributes from concept-based extraction and attributes from instance-based extractions.

FIG. 9 illustrates various equations used to calculate typicality scores for extracted attributes. For concept-based extraction, an attribute list with the format (c, a, n(c, a)) can be obtained. Grouping this list by c, a list of attributes observed about c and their frequency distribution can be determined. With this information, typicality score P(a|c) can be obtained as depicted in equation 901

For instance-based extraction, one or more attribute lists with the format (i, a, n(c, a)) can be obtained. Each different instance-based list can be obtained from a different data corpus, such as, for example, web documents, query log, and knowledge base respectively. A separate typicality score can be calculated from each different instance-based list. Separate typicality scores for instance-based lists can then be aggregated with a typicality score for the concept-based list. To connect an instance-based pattern with a concept, P(a|c) can be expanded as depicted in equation 902.

With the expansion in equation 902, P(a|i, c) and P(i|c) can be calculated to determine a typicality score. For example, consider an instance-based pattern "the age of George Washington". The instance-based pattern can contribute to the typicality scoring of age for the concept president, knowing that 'George Washington' is an instance of the concept president. In equation 902, P(a|i, c) quantifies the attribute typicality of age for 'George Washington' when its underlying concept is president, while P(i|c) represents how representative 'George Washington' is for the concept president.

Under this simplifying assumption, P(a|i, c) can be calculated as depicted in equation 903 and P(i|c) can be calculated as depicted in equation 904. Based on equations 903 and 904, P(c|i) can be obtained from the knowledge base. P(c|i) represents how likely a concept c is for a given instance i. P(c|i)=1 is the concept-instance is observed in the knowledge base and P(c|i)=0 otherwise.

With typicality scores, a machine can be used to perform the inference. That is, to find a more likely concept based on a set of attributes. For example, to find concept c as depicted in equation 905 where A is a sequence of attributes. The probability of concepts can be estimated user a naïve Bayes model as depicted in equation 906.

C. Using Heuristic Rules to Detect Column Header

Heuristic rules can also be used to detect a column header. For example, when the cell type of a header row differs from the cell type of other cells, the header row is more likely a column names header. Turning to FIG. 10, FIG. 10 illustrates an example table 1000 (e.g., a web table). Within table 1000, cells 1013, 1014, 1015, 1016, and 1017 are strings and but values in other cells of columns 1003, 1004, 1005, 1005, and 1007 are digits. Thus, cells 1013, 1014, 1015, 1016, and 1017 are more likely part of a column header (i.e., column header 1022). As such, it is possible to identify column header 1022 as a column header even if the row is not expressly defined as a column header.

The length and/or number of tokens in a cell versus the length and/or number of tokens in other cells in the column can also be considered. For example, cell 1011 includes two tokens "County" and "Name". Other cells in subject column 1021 contain one token. Likewise, cell 1012 includes two tokens "County" and "Seat". Other cells in column 1002 contain one token. As such, cells 1011 and 1012 are more likely part of a column header (e.g., column header 1022).

Whether the content of a cell and other cells in a column are summarized with the same or different regular expressions can also be considered. For example, column 1013 contains cell values "Year Founded", "1854", "1839", "1760", etc. However, "Year Founded" is summarized with a different minimal regular expression than the minimal regular expression summarizing each of "1854", "1839", "1760", etc. Thus, cell 1013 is likely part of a column header (e.g., column header 1022).

In another example, a column may contain cell values "SocialSecNo", "123-45-678", "345-67-8901", "678-90-1234". All cells have the same number of characters. However, "SocialSecNo" is summarized with a different minimal regular expression than the minimal regular expression summarizing each of 123-45-678", "345-67-8901", "678-90-1234". As such, the cell containing "SocialSecNo" is more likely to be part of column header.

Multi-Row Column Headers

Aspects of the invention can be used to detect multi-row column headers. For example, some tables have a header row duplicated every page-worth of rows. Other tables use multiple header rows, where one row is more general and another row more specific. For example, a table could have a row with a cell value "Temperature" spanning first and second columns. The table could have another row with a cell value "Avg" in the first column and "Max" in the second column. Candidate column name construction module 401, frequency calculation module 402, and column header detection module 403 can be configured to detect multiple header rows for a table.

Understanding Tables

Figure 11:
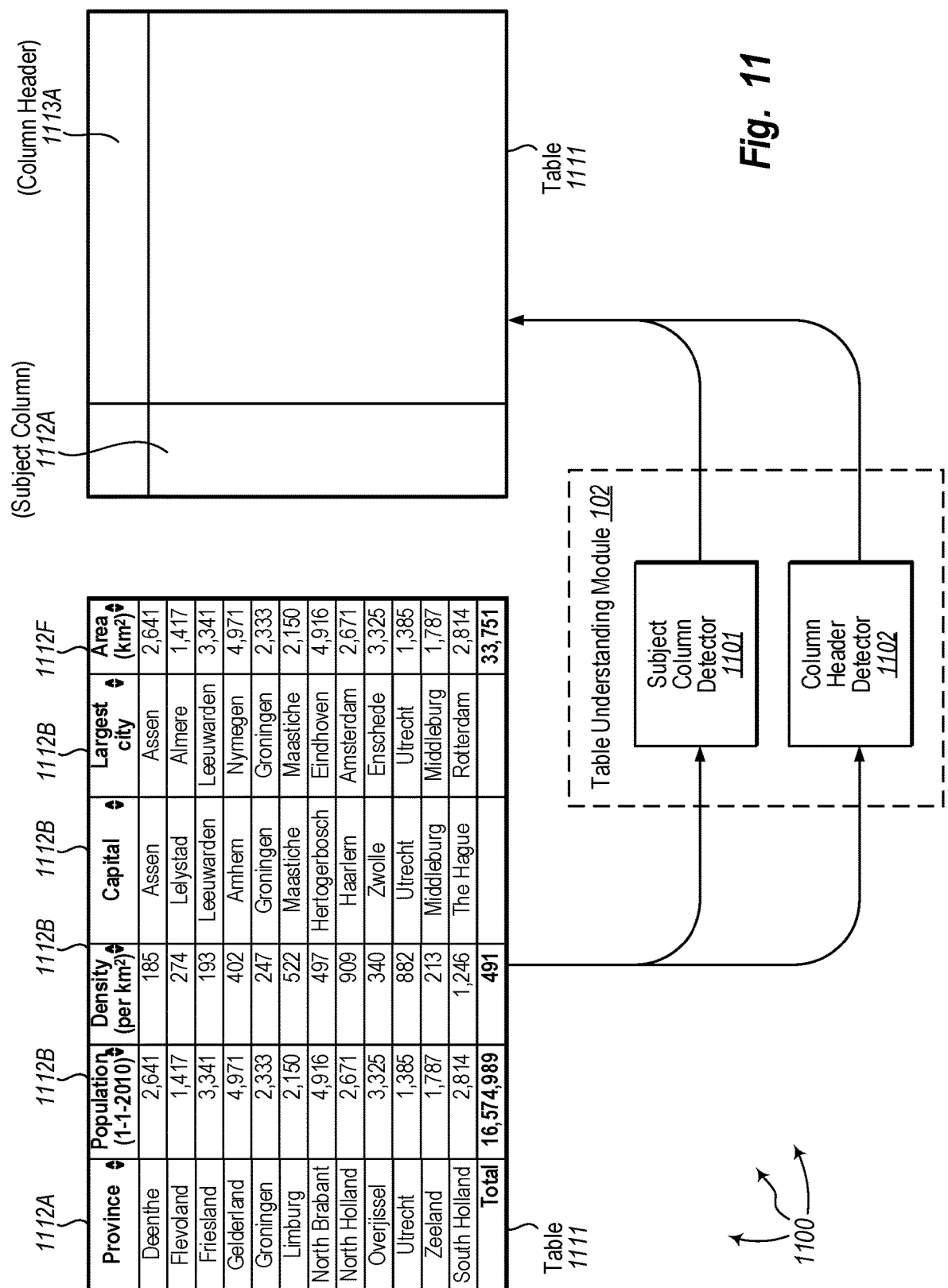
FIG. 11 illustrates an example architecture that facilitates understanding a table.

FIG. 11 illustrates an example architecture 1100 that facilitates understanding a table. Referring to FIG. 11, computer architecture 1100 includes subject column detector 1101 and column header detector 1102. Each of subject column detector 1101 and column header detector 1102 can be connected to one another over (or be part of) a network, such as, for example, a Local Area Network ("LAN"), a Wide Area Network ("WAN"), and even the Internet. Accordingly, each of subject column detector 1101 and column header detector 1102 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Generally, subject column detector 1101 can detect one or more subject columns of a table. To detect one or more subject columns, subject column detector 1101 can implement one or more of the modules of computer architecture 200 and used any related algorithms as described. Generally, column header detector 1102 is configured to detect a column header of a table. To detect a column header, column header detector 1102 can implement one or more of the modules of computer architecture 400 and use any related algorithms as described.

Subject column detector 1101 and column header detector 1102 can be included in table understanding module 102. Alternatively, subject column detector 1101 and column header detector 1102 can operate outside of table understanding module 102.

As depicted, table 1111 (e.g., a web table) includes columns 1112A-1112F and rows 1113A-1113M. Each of subject column detector 1101 and column header detector 1102 can access table 1111.

Subject column detector 1101 can detect the subject column of table 1111. To determine the subject column of table 1111, subject column detector 1101 can consider columns 1112A, 1112D, and 1112E (the 3 left most non-numeric columns). Using any of the described algorithms, subject column detector 1101 can calculate a score for each of columns 1112A, 1112D, and 1112E. For example, a column score can be calculated form the co-occurrence of table values with column names in other tables and/or the co-occurrence of table entities and column names in a knowledge base. Based on calculated scores, a column from among columns 1112A, 1112B, and 1112E can be detected as the subject column for table 1111. For example, column 1112A can be selected as the subject column for table 1111.

Column header detector 1102 can detect the header row of table 1111. To determine the column header for table 1111, column header detector 1102 can use any of the described algorithms, such as, for example, column header detection using web tables, column header detection using a knowledge base, conceptualization, heuristics, etc., to detect a row of table 1111 as a column header. For example, column header detector 1102 can construct a set of candidate column names for the table 1111 from data defining table 1111. Column header detector 1102 candidate can calculate column name frequencies and non-candidate column name frequencies for each candidate column name. Column header detector 1102 candidate can select a row of tables 1111 as column header based on the calculated frequencies. For example, row 1113A can be detected as a column header for table 1111.

Implementations of the invention can be used in structured data search system (SDSS) that indexes structured information such as tables in a relational database or html tables extracted from web pages and allows users to search over the structured information (tables). The SDSS can index and provide multiple search mechanisms over structured information. One search mechanism is keyword search where the user poses a keyword query such as 'african countries gdp' to the SDSS. The SDSS returns a ranked list of tables which appropriately satisfies the information need of user. Another mechanism is data finding data where the user specifies a set of entities (e.g., present in a spreadsheet) and optionally additional keywords to the SDSS. The SDSS returns tables that contain the requested information for that set of entities.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the method comprising:
    receiving one or more tables, wherein the one or more tables include tuples that are not expressly defined as one of a subject tuple or a non-subject tuple;
    calculating a distinctness metric for a tuple from a table, wherein the distinctness metric indicates distinctness of cell values in the tuple;
    selecting the tuple as a potential subject tuple of the table based at least in part on determining that the distinctness metric for the tuple exceeds a threshold;
    determining a co-occurrence for values in the tuple by determining how often the values in the tuple are included in subject tuples in a plurality of other tables, the determined co-occurrence indicating a likelihood of the tuple being a subject tuple;
    calculating a co-occurrence score for the values in the tuple based on the co-occurrence and a number of occurrences of the values in the plurality of other tables; and
    classifying the tuple as one of a subject tuple of the table or a non-subject tuple of the table based on the determined co-occurrence score.

2. The method of claim 1, wherein selecting the tuple from the table as potentially being a subject tuple of the table comprises selecting a column from the table as potentially being a subject column of the table;
    wherein determining the co-occurrence for the values in the tuple by determining how often the values in the tuple are included in subject tuples in the plurality of other tables comprises determining a co-occurrence for values in the column by determining how often the values in the column are included in subject columns in the plurality of other tables; and
    wherein classifying the tuple as one of a subject tuple of the table or a non-subject tuple of the table based on the determined co-occurrence comprises classifying the column as one of a subject column of the table or a non-subject column of the table based on the determined co-occurrence.

3. The method of claim 1, further comprising calculating a score for the tuple based on the determined co-occurrence, the calculated score indicating a likelihood of a candidate subject tuple being a true subject tuple; and
    wherein classifying the tuple as one of: a subject tuple of the table or a non-subject tuple of the table based on the determined co-occurrence comprises classifying the tuple based on the calculated score for the tuple.

4. The method of claim 1, further comprising annotating the table with the tuple based on classification of the tuple.

5. The method of claim 1, further comprising using the tuple to index the table based on classification of the tuple.

6. A method for use at a computer system, a first one or more tuples and a second one or more tuples forming a table at the computer system, the method comprising:
constructing a set of candidate tuple names for the first one or more tuples;
for each candidate tuple name in the set of candidate tuple names:
searching a plurality of other tables for use of the candidate tuple name;
calculating a first metric that indicates how many of the plurality of other tables comprise the candidate tuple name used as a tuple name or a first row of data; and
calculating a second metric that indicates how many of the plurality of other tables comprise the candidate tuple name used as something other than a tuple name or a first row of data; and
selecting a tuple, from among the second one or more tuples, as a header tuple for the first one or more tuples when a fraction of values in the tuple for which the first metric is greater than the second metric exceeds a defined threshold value.

7. The method of claim 6, further comprising inferring that another tuple, from among the first one or more tuples, is a hypernym of cell values contained in the other tuple based on the cell values contained in the other tuple; and
wherein selecting a tuple, from among the second one or more tuples, as a header tuple for the first one or more tuples comprises selecting a tuple, from among the second one or more tuples, as the header tuple based on the inference.

8. The method of claim 7, wherein inferring that another tuple, from among the first one or more tuples, is the hypernym of cell values contained in the other tuple comprises referring to a knowledge base to infer that another tuple, from among the first one or more tuples, is the hypernym of cell values contained in the other tuple.

9. The method of claim 8, wherein referring to the knowledge base comprises extracting one or more concept attributes and one or more instance attributes from the knowledge base.

10. The method of claim 6, further comprising annotating the table with the selected tuple.

11. The method of claim 6, further comprising using the selected tuple to index the table.

12. The method of claim 6, further comprising computing a feature of the table from the selected tuple.

13. A system, comprising:
one or more processors;
system memory coupled to one or more hardware processors, the system memory storing instructions that are executable by the one or more hardware processors;
the one or more processors executing the instructions stored in the system memory to:
receive one or more tables, wherein the one or more tables include tuples that are not expressly defined as one of a subject tuple or a non-subject tuple;
calculate a distinctness metric for a tuple from a table of the one or more tables, wherein the distinctness metric indicates distinctness of cell values in the tuple and includes one or more of a ratio of a number of distinct cell values to total number of cells and a number of occurrences of a most repeated value;
select the tuple as potentially being a subject tuple of the table based at least in part on determining that the distinctness metric for the tuple exceeds a threshold;
determine a co-occurrence for values in the tuple by determining how often the values in the tuple are included in subject tuples in a plurality of other tables, the determined co-occurrence indicating a likelihood of the tuple being a subject tuple;
calculate a co-occurrence score for the values in the tuple based on the co-occurrence and a number of occurrences of the values in the plurality of other tables;
classify the tuple as one of a subject tuple of the table or a non-subject tuple of the table based on the determined co-occurrence score;
modify an index based on the classification of the tuple; and
provide the index for use by a search system that receives user searches.

14. The system of claim 13, wherein the one or more processors executing the instructions stored in the system memory to select a tuple from the table as potentially being a subject tuple of the table comprises the one or more processors executing the instructions stored in the system memory to select a column from the table as potentially being a subject column of the table;
wherein the one or more processors executing the instructions stored in the system memory to determine the co-occurrence for the values in the tuple by determining how often the values in the tuple are included in subject tuples in the plurality of other tables comprises the one or more processors executing the instructions stored in the system memory to determine how often values in the column are included in subject columns in the plurality of other tables; and
wherein the one or more processors executing the instructions stored in the system memory to classify the tuple as one of: a subject tuple of the table or a non-subject tuple of the table based on the determined co-occurrence comprises the one or more processors executing the instructions stored in the system memory to classify the column as one of: a subject column of the table or a non-subject column of the table based on the determined co-occurrence.

15. The system of claim 13, further comprising the one or more processors executing the instructions stored in the system memory to annotate the table with the tuple based on classification of the tuple.

16. The system of claim 13, further comprising the one or more processors executing the instructions stored in the system memory to use the tuple to index the table based on classification of the tuple.

* * * * *